United States Patent [19]

Okutani et al.

[11] Patent Number: 5,247,839
[45] Date of Patent: Sep. 28, 1993

[54] TORSION ANGLE DETECTION APPARATUS AND TORQUE SENSOR

[75] Inventors: Norio Okutani, Neyagawa; Koichi Nakazawa, Amagasaki, both, Japan

[73] Assignee: Matsushita Electric Industrial Co., Ltd., Osaka, Japan

[21] Appl. No.: 999,668

[22] Filed: Dec. 30, 1992

Related U.S. Application Data

[63] Continuation of Ser. No. 602,094, Oct. 25, 1990.

[30] Foreign Application Priority Data

Oct. 25, 1989 [JP] Japan .................................. 1-279345

[51] Int. Cl.$^5$ .............................................. G01L 3/02
[52] U.S. Cl. ..................... 73/862.326; 73/862.324
[58] Field of Search ............... 73/862.324, 862.325, 73/862.326

[56] References Cited

U.S. PATENT DOCUMENTS 4,600,357 7/1986 Coules .............................. 73/862.34

FOREIGN PATENT DOCUMENTS 0284508 9/1988 European Pat. Off. .......... 73/862.34
2626369 7/1989 France ............................ 73/862.34
2218814 11/1989 United Kingdom ............. 73/862.34

OTHER PUBLICATIONS

Carson, Robert W. "Optical Sensor Measures Torque Without Slip Rings", Oct. 1967, pp. 3-4.

*Primary Examiner*—Donald O. Woodiel
*Assistant Examiner*—Elizabeth L. Dougherty
*Attorney, Agent, or Firm*—Wenderoth, Lind & Ponack

[57] ABSTRACT

A torsion angle detection apparatus, wherein a pair of optical type of encoders are disposed on the coaxial center at a proper interval in the axial direction, and also, the measured shaft is inserted into the axial center position thereof and is secured to the rotary portion of each of the encoders, so that the torsion angle of the measured shaft may be detected with high accuracy and high speed response property from the difference in the detection position by each encoder by the use of an optical type of encoder of high resolution.high speed response property.

6 Claims, 3 Drawing Sheets

FIG. 3
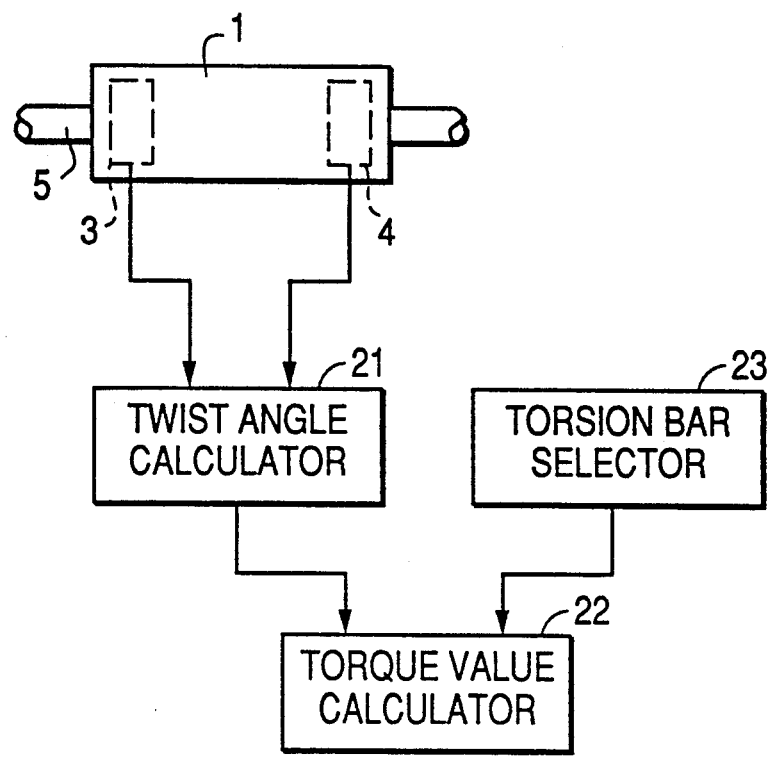
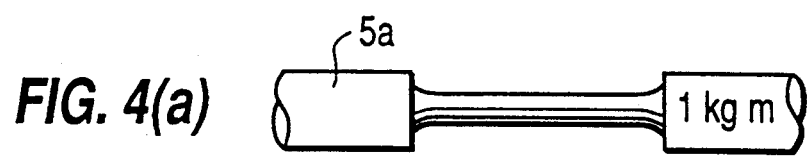
FIG. 4(a)
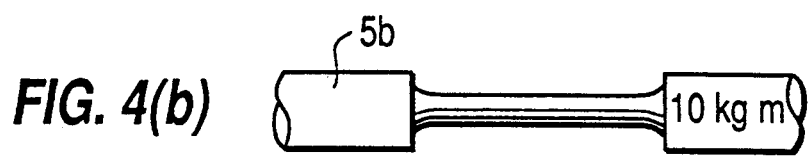
FIG. 4(b)
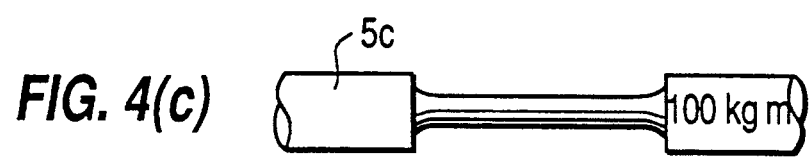
FIG. 4(c)

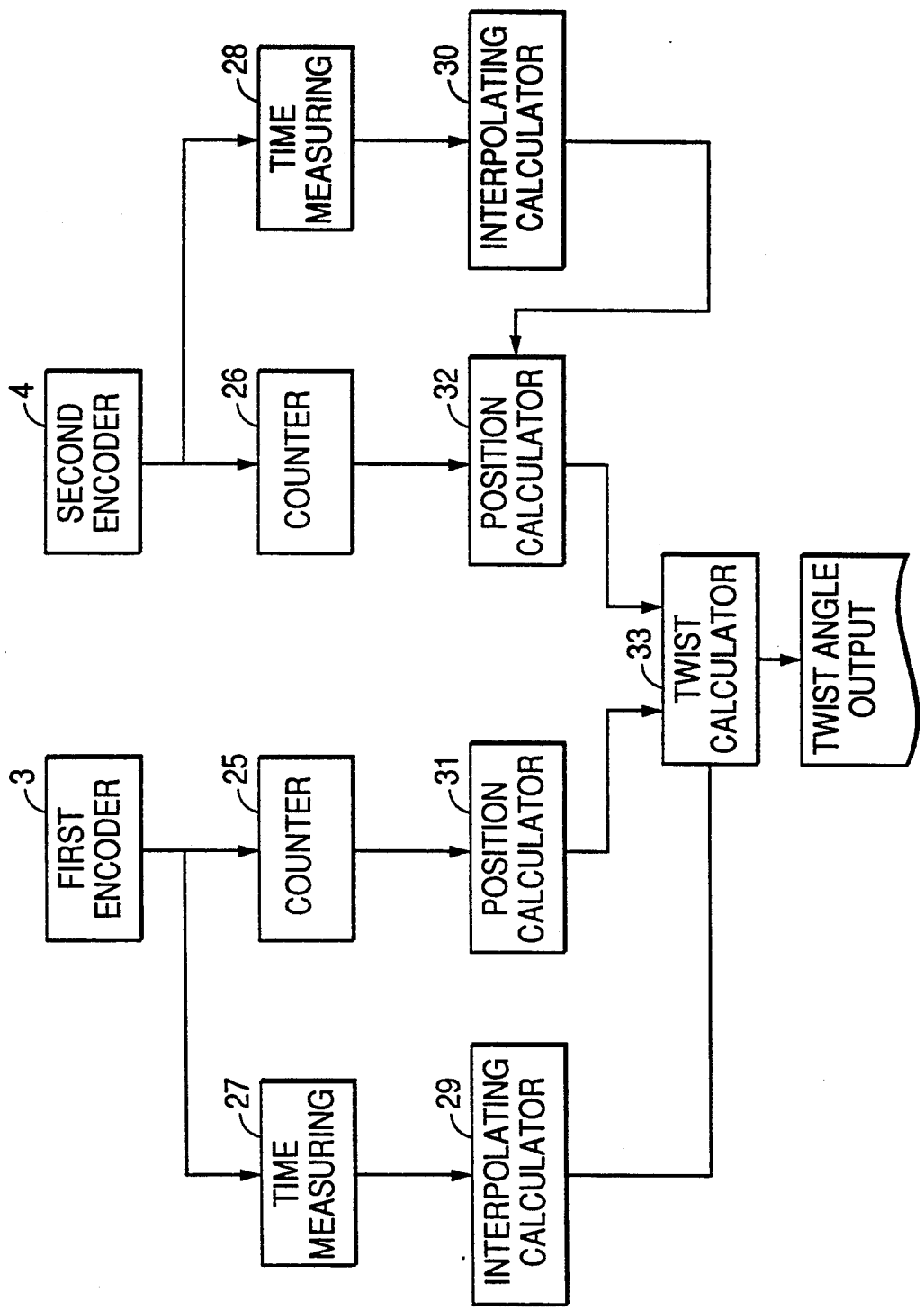

TORSION ANGLE DETECTION APPARATUS AND TORQUE SENSOR

This application is a Rule 62 continuation of now abandoned application, Ser. No. 07/602,094, filed Oct. 25, 1990.

BACKGROUND OF THE INVENTION

The present invention generally relates to a torsion angle detection apparatus and a torque sensor.

Generally a strain sensor is generally known which has a strain gauge pasted on a torsion bar, so that the torque values are adapted to be calculated from the changes in the resistance values to be caused by the strain of the torsion bar.

Also, a torque sensor of a magnetic phase difference system is also proposed where a pair of external gears are secured onto both the side portions of a torsion bar, internal gears are disposed in proximity to the external peripheries thereof, and a magnetic circuit is formed between them, so that the phase differences of the tooth of both the gears are adapted to be detected with the detection coils, and the torque values are adapted to be calculated from the phase differences thereof.

In the above described strain gauge system, minimum resolution is as rough as approximately 0.5 kgm, error is approximately 1%, response property is as low as approximately 2.5 kHz when the maximum measuring value is made 5 kgm by the use of a certain torsion bar, with a problem that a torque sensor of high accuracy and high speed response property cannot be made.

Although the minimum resolution is improved as far as 0.1 kgm, the error is improved as far as 0.1%, the response property is also improved as far as approximately 20 kHz when the maximum measuring value is 5 kgm likewise in the torque sensor of a magnetic phase difference system, a torque sensor of higher accuracy and higher speed response property cannot be provided. Also, as the output density of the detection signal per rotation is restricted in the tooth number of the gears, the torque changes cannot be detected precisely, and further the stable detection signal cannot be obtained in the case of the low speed rotation, so that a driving means for the internal gears is required to cope with them, with a problem that the construction becomes complicated.

Also, a similar problem is provided even in a torsion angle detection apparatus for the measured shaft of the same construction.

SUMMARY OF THE INVENTION

Accordingly, the present invention has been developed with a view to substantially eliminating the above discussed drawbacks inherent in the prior art, and has for its essential object to provide improved torsion angle detection apparatus and torque sensor.

Another important object of the present invention is to provide the improved torsion angle detection apparatus and torque sensor which are capable of detection having higher accuracy and higher speed response property, and detailed detection.

In accomplishing these and other objects, according to a torsion angle detection apparatus of the present invention, a pair of optical type of encoders are disposed on the coaxial center at a proper interval in the axial direction, and also, the measured shaft is inserted into the axial center position thereof and is secured to the rotary portion of each of the encoders.

According to a torque sensor of the present invention, a torsion bar instead of the above described measured shaft is used, and also, a means for calculating the torsion angle between the encoders in accordance with the detection signal from each encoder and a means for calculating the torque value.

It is desirable that a means for detachably securing a torsion bar on each encoder should be provided, and a means for inputting the type of the torsion bars into the torque value calculating means should be provided, so that the torsion bar may be exchanged.

A means for calculating the torsion angle may be composed of a counter for counting the pulse signals to be outputted from each encoder and a means for effecting the interpolating calculation from the elapsed time and a period of the pulse signals between the pulse signals, a means for calculating the positions in accordance with the signals of the above described counter and interpolation calculating means, and a torsion calculating means to which the output signals from the positional calculation means of each encoder are inputted.

According to the torsion angle detection apparatus of the present invention, the torsion angle of the measured shaft may be detected with higher accuracy and higher speed response property from the differences in the detection positions by each encoder with the use of the optical type of encoder of the high resolution and high speed response property. Also, the detection may be effected positively if the measured shaft is at stop, and is at high speed rotation, and also, the number of the slits of the code plate of the encoder may be provided exceptionally more in the case of the gears, the output density per rotation may be made higher, and the detailed detection may be effected.

Also, according to the torque sensor of the present invention, the torque values are calculated and outputted from the torsion angle and the torsion bar torsion rigidity similarly detected, so that a torque sensor having the higher accuracy and the higher speed response property may be obtained.

Also, the torques of the wide range may be detected with more accuracy through the arrangement that the torsion bar may be exchanged.

Further, when the measuring system is a system where the speed is constant or the speed change is slow, the rotation is stable, the pulse signals to be outputted from the encoder are counted, and also, the pulse signal intervals are time divided, the positional detection may be effected, so that the detection of higher accuracy may be effected by the simple circuit construction.

BRIEF DESCRIPTION OF THE DRAWINGS

These and other objects and features of the present invention will become apparent from the following description taken in conjunction with the preferred embodiment thereof with reference to the accompanying drawings, in which;

FIG. 3 is a block diagram of a signal processing circuit of the torque sensor;

FIG. 4 (a) through (c) are the front face views of the various types of torsion bars for exchange use; and FIG. 5 is a block diagram of a torsion angle calculating circuit.

DETAILED DESCRIPTION OF THE INVENTION

Figure 1:
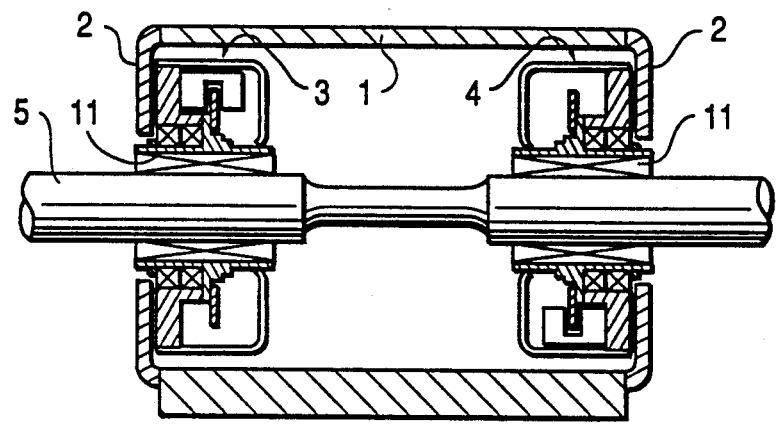
FIG. 1 is a longitudinally sectional front face view showing the whole construction of a torque sensor in one embodiment of the present invention.

Before the description of the present invention proceeds, it is to be noted that like parts are designated by like reference numerals throughout the accompanying drawings.

Referring now to the drawings, there is shown in FIG. 1, a torque sensor according to one embodiment of the present invention, which includes a main body case 1 with support end plates 2 being engaged with at both the ends thereof, first, second optical type of encoders 3, 4 arranged so as to be positioned on the coaxial center on both the end portions within the main body case 1 with the encoders 3, 4 being properly fixed on the support end plates 2 with mounting means, and a torsion bar 5 being fixedly inserted through the axial positions of the encoders 3, 4.

Figure 2:
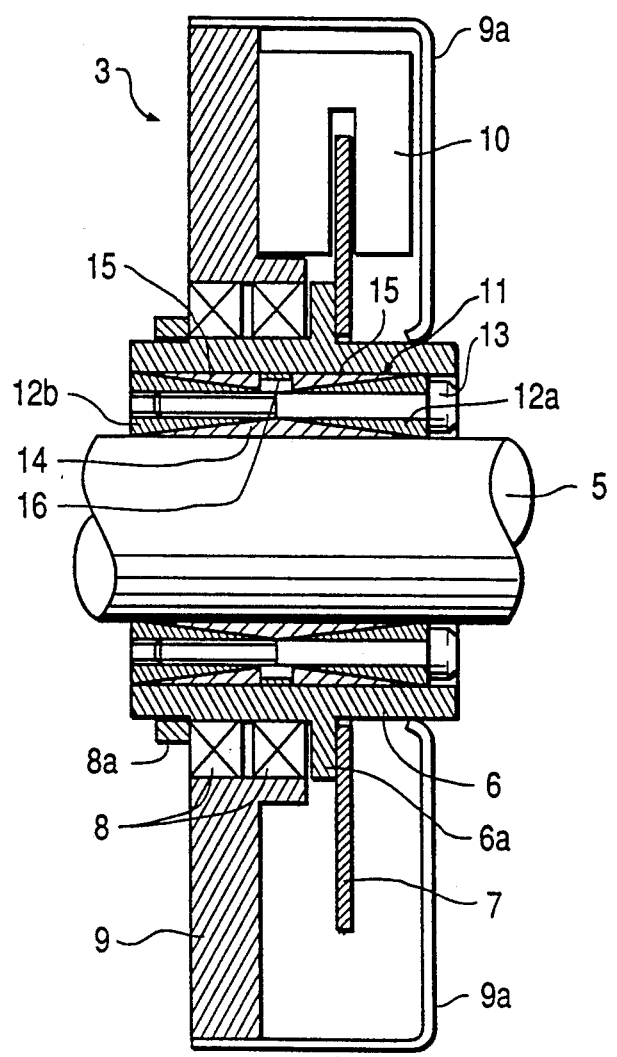
FIG. 2 is an enlarged sectional front face view of the detailed construction of an optical type of encoder which is used into the torque sensor.

The construction of a first encoder 3 will be described with reference to FIG. 2. It is to be noted that a second encoder 4 is also of the same construction. A hollow rotary shaft 6 is externally engaged with the torsion bar 5, with a support flange 6a of the code plate 7 being provided on the external periphery thereof. The internal peripheral portion of the code plate 7 is fixedly in contact with the receiving face of the whole surface of the support flange 6a. The hollow rotary shaft 6 is rotatably supported by a support member 9 composed of a ring-shaped plate through a pair of ball bearings 8. A detection head 10 for detecting the rotation position of the code plate 7 is disposed on the support member 9. The detection head 10 is constructed to apply laser lights upon the code plate 7 from the laser light source, to apply the shading stripes of the Fraunhofer diffraction images caused through the slits formed regularly in the code plate 7, and to output rectangular-wave detection signals corresponding to the slit intervals in accordance with the detection signals from the light detector thereof. A fixed nut 8a of a bearing 8 is screwed to the external periphery of the hollow rotary shaft 6. A cover 9a covers the code plate 7 and the detector 10 with the external peripheral portion being fixed on the external periphery of the support member 9.

A fixing means 11 is interposed between the external peripheral face of the torsion bar 5 and the internal peripheral face of the hollow rotary shaft 6 so as to secure the torsion bar 5 onto the hollow rotary shaft 6 for its axial adjustment. The fixing means is composed of a clamping means comprising a pair of wedge shaped sleeves 12a, 12b which are attracted towards each other with a clamping bolt 13, an angular sleeve 14 to be engaged with the internal peripheries of the wedge shaped sleeves 12a, 12b, and an angular sleeve 15 to be engaged with the external peripheries thereof. The angular sleeve 15 of the external periphery is divided into two at the central position in the axial direction, with a distance piece 16 for adjustment use being interposed therebetween.

As shown in FIG. 3, the detection signals from the first, second encoders 3, 4 are inputted into a torsion angle calculating circuit 21, the torsion angle of the torsion bar 5 between both the encoders 3 and 4 is calculated, and the results thereof are inputted into a torque value calculating circuit 22. Also, the signals from the torsion bar selecting circuit 23 are inputted into the torque value calculating circuit 22. Namely, as shown in FIG. 4 (a) through (c), a proper torsion bar 5 is selected from a plurality of types of torsion bars 5a through 5c designed in accordance with the size of the torque such as for 1 kgm use, 10 kgm use, 100 kgm use and so on, and is adapted to be inserted, fixed into the encoders 3, 4, with a signal for specifying a type of the selected torsion bar being inputted into a torque value calculating circuit 22. In the torque value calculating circuit 22, a torque value is calculated from the torsion angle and the torsion rigidity of the selected torsion bar 5 and is outputted.

The construction of the torsion angle calculating circuit 21 will be described in accordance with FIG. 5. The detection signals of the rectangular wave outputted from the first, second encoders 3, 4 are inputted into the counters 25, 26 and the time measuring portions 17, 18. The counters 25, 26 counts the number of the pulses of the detection signals so as to input it into the positional calculating portions 31, 32. In the time calculating portions 27, 28, a period of a detection signal T and an elapsed time A from the detection of the phase as the reference are measured, are inputted into interpolation calculating portions 29, 30. In the interpolation calculating portions 29, 30, the A/T is calculated from the period T and the elapsed time A, and is inputted into the positional calculation portions 31, 32. In the positional calculating portions 31, 32, the position for each of the slit pitches is detected by the signals from the counters 25, 26, and a position within the slit pitch is detected by the signal from the interpolation calculating portions 29, 30. The calculation results by these positional calculating portions 31, 32 are inputted into the torsion calculating portion 33, the torsion angle is calculated from the difference in the position detected by both the encoders 3, 4 in the torsion calculating portion 33 and is outputted.

The operation of the torque measurement will be described hereinafter. A torsion bar 5 is selected in accordance with the approximate size of the torque to be measured, is fixedly inserted into each of the encoders 3, 4 of the torque sensor. In this case, the torsion bar 5 is inserted into the hollow rotary shaft 6 of each encoder 3, 4, and also, a fixing means 11 with the clamping bolt 13 being loosened is interposed between the internal peripheral face of the hollow rotary shaft 6 and the external peripheral face of the torsion bar 5, the clamping bolt 13 is clamped during the adjusting operation so that the torsion bar 5 and the hollow rotary shaft 6 may be conformed in axial center, and the torsion bar 5 is secured to each of the encoders 3, 4. Also, the type of the selected torsion bars is inputted into the torsion bar selection circuit 23 properly by an input means. It is to be noted that both the ends of the torsion bar 5 are respectively coupled to the rotary system which is to measure the torque.

When the rotary system is driven after the above described setting, the torque is applied upon the torsion bar 5 so as to cause the torsion corresponding to the torque in the torsion bar 5. As the difference is caused in the detection position by the first, second encoders 3, 4 in accordance with the torsion of the torsion bar 5, the torsion bar of the torsion bar may be calculated by the torsion angle calculating circuit 21 from the difference of the detection position. When the rotary system is constant at speed, or the change in the rotating speed is gentle, and the stable rotation condition is retained in the calculating operation of the torsion angle, it can be considered that the moving operation is effected at an equal speed with a high accuracy within each split pitch of the code plate 7, so that the positional detection of the high accuracy may be effected if the positional detection within the slit pitch is divided in time by the torsion angle calculating circuit 21 of the circuit construction as shown in FIG. 5. Also, even if the wave form accuracy of the detection signal by the slit transmission light is bad, it is possible to effect the positional detection of the high accuracy without application of the influences thereof. Thus, the simple circuit construction is capable of better response property and the positional detection with high accuracy. From the torsion angle calculated in this manner, the torque is calculated by the torque value calculation circuit 22, and the torque value thereof is outputted.

In the torque sensor using such optical type of encoders 3, 4 as described hereinabove, by the use of an optical type of encoder of approximately 30,000 pulses in number of the output pulses per rotation, a torque sensor of high accuracy and high speed response with 0.04 kgm in minimum resolution, 0.01% in error, 30 through 300 kHz in response property when the maximum measurement value is made 5 kgm by the use of the same torsion bar shown by way of example in the conventional embodiment.

In the above describe embodiment, there is shown an example where the positional detection within the slit pitch is time divided as the equal speed movement in the torsion angle calculation circuit, but it is needless to say that the positional detection may be effected by the phase division and so on of the detection wave form. In this case, the torque detection with better accuracy in detail may be effected when the rotation is at stop, the rotation is slow, and even at the uncertain rotation condition.

Also, although an example where the present invention is applied to the torque sensor in the above described embodiment, a torsion angle detection apparatus may be provided where a measured shaft instead of a torsion bar is adapted to be inserted, fixed.

As is clear from the foregoing description, according to the arrangement of the present invention, the torsion angle of the measured shaft may be detected with high accuracy and high speed response property from the difference in the detection position by each encoder by the use of an optical type of encoder of high resolution . high speed response property. Also, the positive detection may be effected even if the measured shaft is at stop or is at high speed rotation, and also, the number of the slits of the code plate of the encoder plate is made exceptionally more as compared with the gear, and the output density per rotation is also made higher, so that the precise detection may be effected.

According to the torque sensor of the present invention, the torque value may be calculated similarly from the detected torsion angle and the torsion rigidity of the torsion bar, and is outputted, the accuracy is higher and the response property is higher at speed.

Also, the torque at the wide range may be detected with better accuracy as the torsion bar may be exchanged.

Further, when the measuring system is a system where the speed is constant, or the speed change is small, and the rotation is stably effected, the pulse signals to be outputted from the encoder are counted, and also, the pulse signal intervals are time divided so as to detect the position, with a large effect that the detection of the high accuracy may be effected by the simple circuit construction, and so on.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A torque sensor comprising:
   first and second optical encoders spaced apart from each other in an axial direction, said first and second optical encoders respectively including first and second rotary members having respective centers of rotation along the axial direction;
   a torsion bar having an axial center located along the axial direction, said torsion bar having a small diameter portion extending between first and second larger diameter portions;
   first and second friction grip members for detachably securing said first and second rotary members of said first and second optical encoders to said first and second large diameter portions of said torsion bar, respectively, and for adjusting an axial position of said first and second large diameter portions of said torsion bar secured to said first and second rotary members of said first and second optical encoders, respectively;
   torsion angle calculating means, operatively coupled to said first and second optical encoders, for calculating a torsion angle of said small diameter portion of said torsion bar in accordance with an output of each of said first and second optical encoders; and
   torque value calculating means, operatively coupled to said torque angle calculating means, for calculating a torque value of said torsion bar in accordance with the torsion angle calculated by said torque angle calculating means.

2. A torque sensor as recited in claim 1, wherein said torsion angle calculating means includes first and second pulse counting means for counting rotation interval pulses generated by said first and second optical encoders per each rotation of said first and second rotary members, first and second interpolating means for respectively detecting first and second rotational positions within a respective rotation interval based on a period of said rotation interval pulses and a time elapsed from a previous rotation interval pulse, first and second rotational position calculating means for respectively determining rotational positions of said first and second rotary members based on a count value of said first and second counting means and the first and second rotational positions within the respective rotation interval, and means for determining a difference between the rotational positions of said first and second rotary members.

3. A torque sensor as recited in claim 1, wherein each of said first and second friction grip members includes:
   a rotable hollow shaft, said first and second rotary members of said first and second optical encoders fixed to an outer periphery of said rotatable hollow shaft of said first and second friction grip members, respectively; and,
   a fixing mechanisms secured to an inner periphery of said rotatable hollow shaft, said fixing mechanisms including a clamping bolt and an angular sleeve member for contacting either one of said first and second larger diameter portions of said torsion bar, wherein upon a tightening of said clamping bolt said angular sleeve member moves toward the axial center and upon a loosening of said clamping bolt said angular sleeve member moves away from the axial center, thereby detachable securing and adjusting an axial position of said first and second larger diameter portions of said torsion bar.

4. A torque sensor as recited in claim 3, further comprising means for inputting a rigidity value of said torsion bar into said torque value calculating means, wherein said torque value calculating means calculates the torque value in accordance with said rigidity value.

5. A torque sensor as recited in claim 4, wherein said torsion angle calculating means includes first and second pulse counting means for counting rotation interval pulses generated by said first and second optical encoders per each rotation of said first and second rotary members, first and second interpolating means for respectively detecting first and second rotational positions within a respective rotation interval based on a period of said rotation interval pulses and a time elapsed from a previous rotation interval pulse, first and second rotational position calculating means for respectively determining rotational positions of said first and second rotary members based on a count value of said first and second counting means and the first and second rotational positions within the respective rotation interval, and means for determining a difference between the rotational positions of said first and second rotary members.

6. A torque sensor as recited in claim 3, wherein said torsion angle calculating means includes first and second pulse counting means for counting rotation interval pulses generated by said first and second optical encoders per each rotation of said first and second rotary members, first and second interpolating means for respectively detecting first and second rotational positions within a respective rotation interval based on a period of said rotation interval pulses and a time elapsed from a previous rotation interval pulse, first and second rotational position calculating means for respectively determining rotational positions of said first and second rotary members based on a count value of said first and second counting means and the first and second rotational positions within the respective rotation interval, and means for determining a difference between the rotational positions of said first and second rotary members.

* * * * *